United States Patent [19]
Bitzer et al.

[11] 3,770,012
[45] Nov. 6, 1973

[54] RANDOM ACCESS SELECTION APPARATUS

[75] Inventors: Donald L. Bitzer, Urbana; Lyle E. Bandy, Decatur; Roger L. Johnson, Monticello; Dominic O. Skaperdas, Champaign, all of Ill.

[73] Assignee: University of Illinois Foundation, Urbana, Ill.

[22] Filed: Feb. 5, 1973

[21] Appl. No.: 329,901

Related U.S. Application Data

[62] Division of Ser. No. 195,884, Nov. 4, 1971, which is a division of Ser. No. 850,965, Aug. 18, 1969, Pat. No. 3,641,529.

[52] U.S. Cl............ 137/596.16, 137/119, 137/608, 235/201 ME
[51] Int. Cl............................................. F16k 11/10
[58] Field of Search.. 137/118, 119, 596.14–596.18, 137/625.6–625.66; 91/454, 455; 235/201 ME; 251/29

[56] References Cited
UNITED STATES PATENTS

| | | | |
|---|---|---|---|
| 2,460,908 | 2/1949 | Scott | 137/625.64 |
| 2,984,257 | 5/1961 | McCormick et al. | 137/596.16 X |
| 2,992,652 | 7/1961 | Fellberg | 137/118 |
| 3,265,089 | 8/1966 | Nill | 137/596.16 |
| 3,426,800 | 2/1969 | Bauer | 235/201 ME X |
| 3,504,692 | 4/1970 | Goldstein | 137/119 |

Primary Examiner—Henry T. Klinksiek
Attorney—Charles J. Merriam et al.

[57] ABSTRACT

Random access information retrieval apparatus for selecting a particular item from a plurality thereof including an improved pair of x-y coordinate digitally positionable devices which are driven by a four-way control valve. A polar coordinate random access information retrieval apparatus including a rotatable recording disc having information recorded on at least one surface thereof, a transducer for detecting said information, radial positioning means for moving said transducer radially along said disc, and angular positioning means coupled to said recording disc for incrementally rotating said disc to position desired information on said disc adjacent said transducer. An improved four-way control valve including a valve housing having a pair of inlet ports for connection to a pressure source and a pair of outlet ports for connection to a load, a first control chamber communicating one of said inlet ports with one of said outlet ports, a second control chamber immediately adjacent said first chamber and communicating the other of said inlet ports with the other of said outlet ports, a diaphragm intermediate said first and second chambers and forming a common wall therebetween, and a diapragm control means for moving said diaphragm to selectively seal one of said inlet ports in said respective first and second chambers to control the fluid flow between said inlet and outlet ports.

9 Claims, 10 Drawing Figures

PATENTED NOV 6 1973 3,770,012

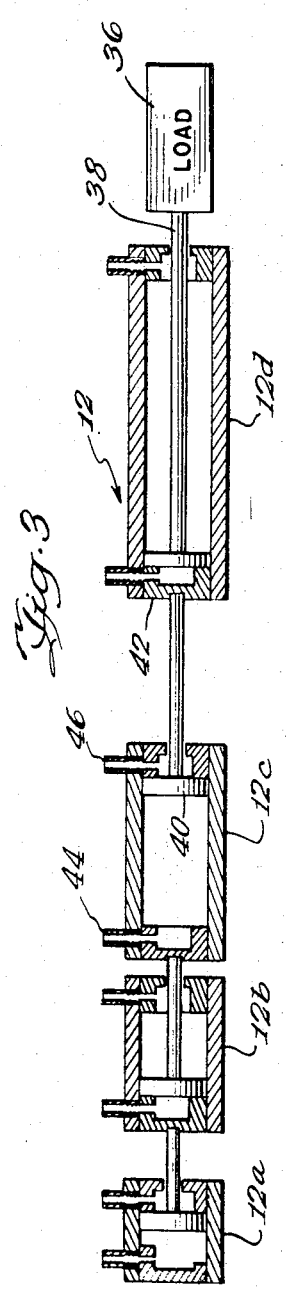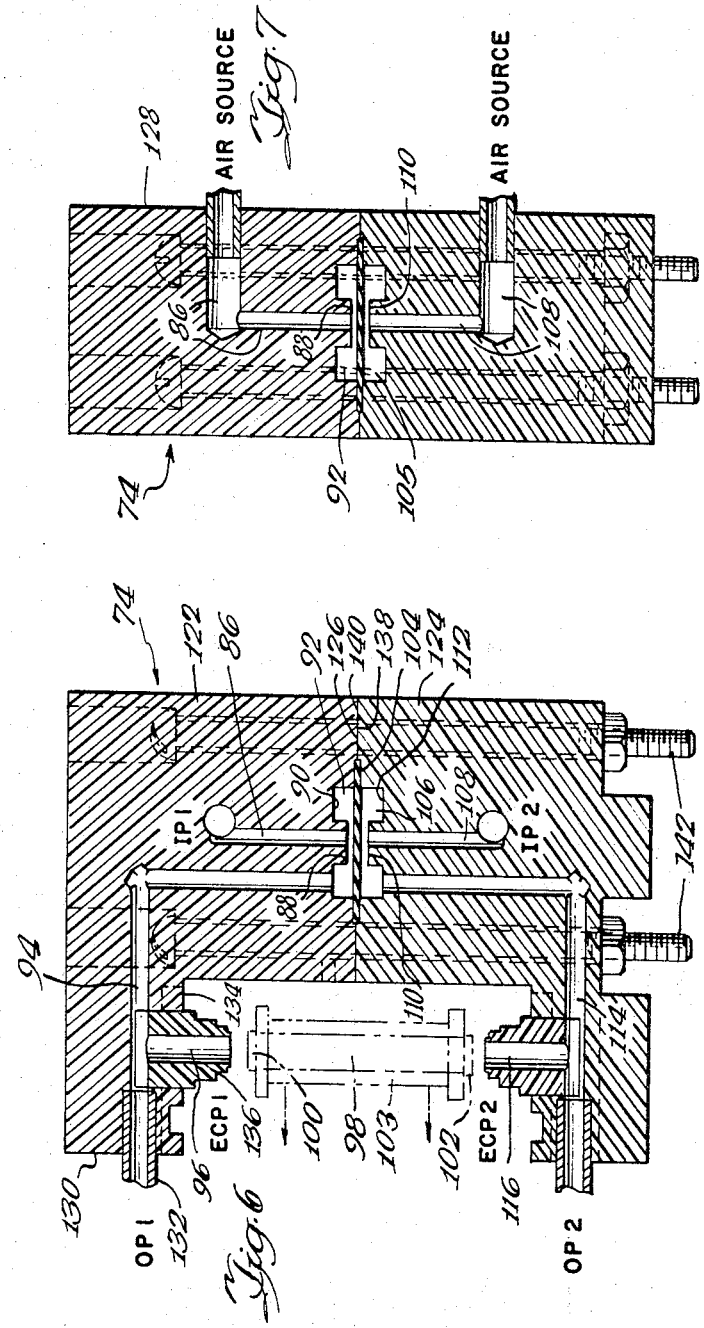

RANDOM ACCESS SELECTION APPARATUS

This is a division of application Ser. No. 195,884, Filed Nov. 4, 1971, which in turn is a division of application Ser. No. 850,965, filed Aug. 18, 1969 now U.S. Pat. No. 3,641,529.

BACKGROUND OF THE INVENTION

This invention relates to random access retrieval devices for selecting elements from a plurality thereof and in particular to new and improved random access apparatus utilizing digitally positionable members for selecting the desired elements. Another aspect of this invention relates to an improved four-way control valve for controlling the digital position of such members.

The principles of the present invention are particularly useful in random access retrieval systems wherein a single item must be rapidly selected from a group of such items. For instance, reference may be made to U.S. Pat. No. 3,405,457, "Versatile Display Teaching System" issued to Donald L. Bitzer, wherein there is described a flexible computer-controlled system for transmitting selected information to a number of student terminals. In such a computer-based education system, thousands of student terminals can be connected to single computer. Each of these student terminals must be very flexible, providing random access audio or video information, including computer-generated graphics superimposed on photographic slide information. However, the cost of each terminal must be maintained as low as possible in order that the system advantages in teaching large numbers of students can be economically realized.

Various types of random access retrieval systems now exist in the art, however, such devices are extremely cumbersome and expensive. In particular, most of said systems utilize pneumatically driven movable members selectively operated by relatively large, slow-operating and very expensive four-way control valves. Pilot valves employing small solenoids for controlling the main air flow can somewhat increase the operating speed of the system, however, known devices of this type still require elaborate construction and are therefore relatively expensive items and impractical for use in large numbers.

SUMMARY OF THE INVENTION

Therefore, in accordance with the principles of the present invention, there is provided an inexpensive, high speed random access retrieval device having two sets of right-angled digitally positionable pneumatic elements moving rectilinearly in an x-y coordinate system for selecting any particular item from a group thereof. In another aspect of the invention, there is provided a novel four-way control valve construction containing only a single movable diaphragm and an electrically actuated member controlling an exhaust-control port for selectively moving the diaphragm between either one of two input ports so as to divert the driving air source to either one of two output ports in a valve-switching time of less than one two-hundredth of a second and with a switching air loss of less than one-eightieth cubic inch.

In a random access model constructed in accordance with the principles of the present invention, and adapted for use as a random access photographic slide selector, the constructed slide selector was capable of randomly selecting in one-fifth of a second any image from a 4 × 4 inch film plate containing 256 separate images arranged in a 16 × 16 matrix. The constructed slide selector included eight of the novel four-way control valves of this invention four each for respective X and Y axis piston-cylinder trains.

In another random access model constructed in accordance with the principles of the present invention, and adapted for use as a random access audio selector, the audio selector was capable of randomly selecting any desired audio segment from 2,048 segments, wherein 32 segments are recorded in each of 64 radially spaced circular tracks on a magnetic recording disc. The constructed audio selector operated as a polar coordinate selection system having eleven of the previously mentioned four-way control valves—six for positioning a piston-cylinder train radially to any one of the 64 tracks in about 0.2 second, and five for positioning another piston-cylinder train to rotate the disc angularly to any one of the 32 segments in about one-third seconds.

BRIEF DESCRIPTION OF THE DRAWINGS

The invention will be better understood from the following detailed description thereof taken in conjunction with the accompanying drawings, in which:

FIG. 3 is a sectional view illustrating the construction details of the digitally positionable devices shown in FIGS. 1 and 2;

FIGS. 6 and 7 are schematic views illustrating the construction details of the novel four-way control valve in accordance with this aspect of the invention;

DESCRIPTION OF THE PREFERRED EMBODIMENTS

Figure 1:
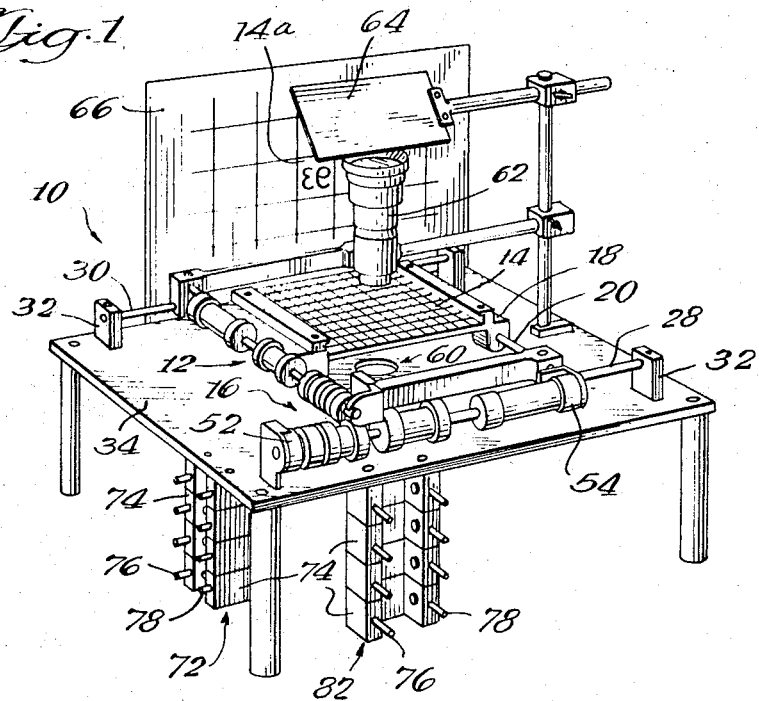
FIG. 1 illustrates a random access slide selector incorporating the principles of the present invention and constructed in accordance therewith in an improved x-y coordinate selection device utilized, for example, to select individual slides from a 16 × 16 matrix.
Figure 2:
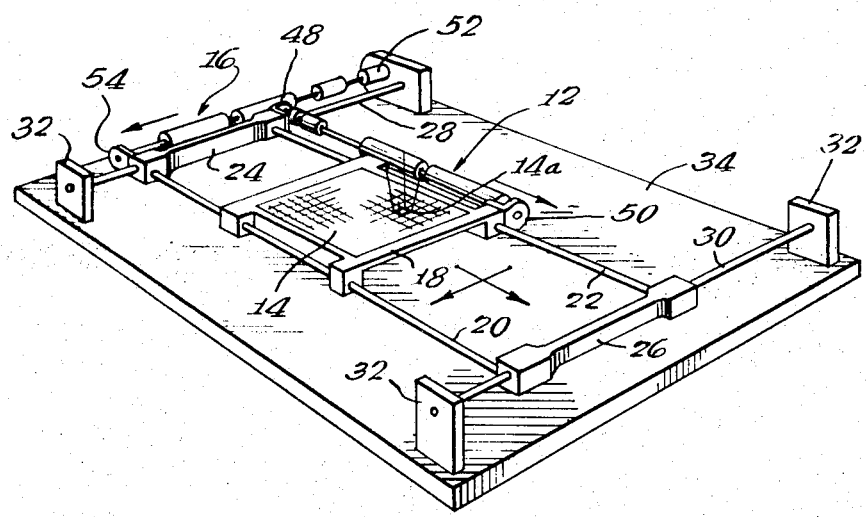
FIG. 2 is a perspective view illustrating the x-y digitally positionable piston-cylinder devices moving rectilinearly along respective orthogonal x and y axis for selecting any one of the 256 slides.

Referring now to FIGS. 1–3 there is illustrated a random access slide selector 10 including digitally addressable, pneumatically driven piston-cylinders 12 for driving a film plate 14 in first direction, and a similar set of pneumatically driven elements 16 arranged perpendicular to the elements 12 for corresponding movement of the slide tray. The film plate 14 contains a square matrix of 16 × 16 or 256 images thereon and is mounted within a slide tray 18 which is slidably mounted on parallel rods 20, 22. The slide tray or carriage 18 including the rods 20, 22 are slidably mounted by suitable means 24, 26 to a second pair of stationary rods 28, 30. As indicated most clearly in FIG. 2, piston-cylinders 12 control the position of the slide tray 18 along the parallel rods 20, 22, and the whole assembly is slidably positioned along parallel rods 28, 30 under control of the piston-cylinders 16. Suitable bracket means 32 are provided for rigidly mounting the slide selector components to a base 34.

The piston-cylinders trains 12, 16 are of a construction well known in the art in which either side of the cylinder is pressurized while the other is vented to the atmosphere. A series-mounted set of four piston-cylinders 12 are shown in FIG. 3, in which piston-cylinders 12a and 12c are fully extended whereas cylinders 12b and 12d are fully retracted. The load 36 representing the slide tray 18 is connected to the free end of the last piston 38. Each of the two remaining pistons has a free piston end 40 slidably movable between two end positions of a cylinder, and a captured piston end 42 which is mounted to the next succeeding cylinder. Either one of the piston cylinder inlet ports 44, 46 is pressurized while the other is vented to the atmosphere in order to selectively move the respective piston end 40 between the two cylinder end positions. The cylinder nearest the fixed end must displace all of the other series-mounted cylinders plus the load; therefore, the cylinder 12a with the smallest stroke length is placed at the fixed end. Cylinders 12b, 12c and 12d with increasing stroke length are placed in series from the fixed end to the load end. For example, referring to FIGS. 1 and 2, within piston-cylinder group 12, end 48 is fixed in position with respect to parallel rods 20, 22 whereas end 50 is slidably movable along the rods. Similarly, in piston-cylinder group 16, end 52 is fixed in position with respect to parallel rods 28, 30 whereas end 54 is slidably movable along the rods.

As shown in FIG. 3, the piston-cylinders are each constructed with the succeeding cylinders having twice the stroke length of the preceding cylinder. Thus, cylinder 12a has a stroke length L, cylinder 12b a stroke length 2L, cylinder 12c a stroke length 4L, and cylinder 12d a stroke length 8L. The stroke length of the smallest cylinder is chosen so as to correspond to the smallest incremental displacement required along rods 20, 22 and 28, 30.

As an example, in a constructed model of the invention, the film plate 14 is 4 inches square and contains 256 images arranged in a 16 × 16 matrix. Thus, each image is ¼ × ¼ inch so that the stroke length of the smallest cylinder 12a is one-fourth inch, cylinder 12b — one-half inch, cylinder 12c — 1 inch, and cylinder 12d-2 inches. As an example of digital addressing of the piston cylinder trains 12, 16, initially, the movement of piston-cylinders 16 along rod 28 can be defined as along the x-axis, whereas movement of piston cylinder 12 along rod 22 can be defined as along the y-axis of an orthogonal x-y coordinate system. If the image at x-11 and y-4 is to be selected, the 2 inches, ½ inch, and ¼ inch piston cylinders of group 16 are to be selected on the x-axis (1011 in binary notation) and the 1 inch piston cylinder of group 12 on the y-axis (0100) are activated. This would place image 14a directly above light source means 60 for projecting the mage through lens assembly 62 to suitable means, such as reflector 64, and on to screen means 66. It is understood that the projection means illustrated in FIG. 2 have merely been given for purposes of an example. Thus, in the display teaching system previously mentioned, a random access slide selector 10 would be located at each student terminal, and the selected image 14n would be projected for display at the particular station display means.

Figure 4:
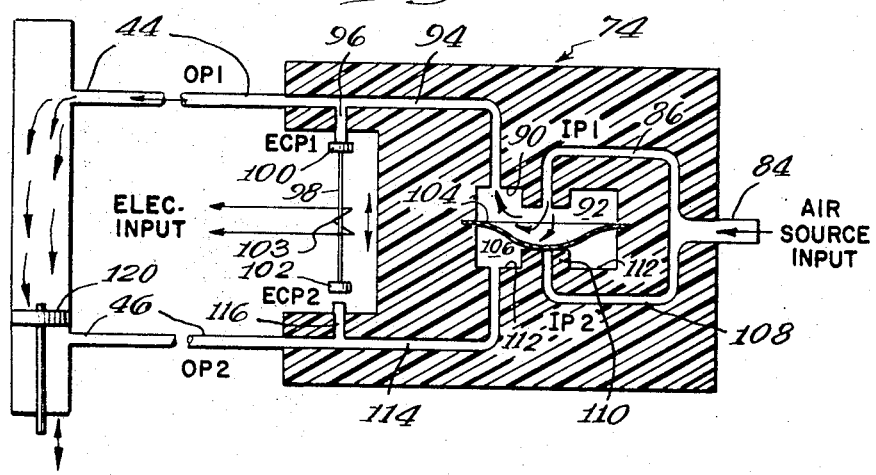
FIG. 4 is a schematic view illustrating a novel four-way control valve with the control diaphragm in a first position in accordance with another aspect of the present invention.
Figure 5:
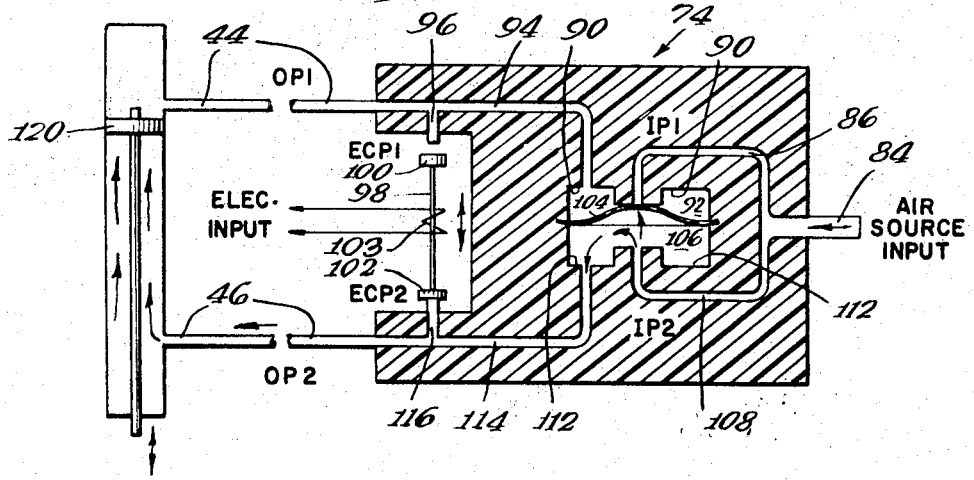
FIG. 5 is a schematic view illustrating the control valve of FIG. 4 with the diaphragm in a second operating position.

The schematic views of FIGS. 4 and 5, and the sectional valve assembly views of FIGS. 6 and 7 illustrate a unique four-way control valve for activating the piston-cylinders 12 and 16. It is to be understood that while the four-way control valve to be illustrated hereinafter can be applied to any apparatus wherein it is desired to selectively connect either of two output ports with a fluid source, it is particularly useful for driving digitally positionable devices. Furthermore, particularly in view of the case of construction and corresponding low costs thereof, the control valve illustrated in FIGS. 4–7 when utilized in the random access aspect of this invention provides significantly improved apparatus which can be practically employed in a display teaching system as previously described.

In particular, with reference to FIG. 1, there is illustrated a first control valve assembly 72 containing a series of four control valves 74 with suitable outlet ports 76, 78 for connection to respective piston-cylinder inlet ports 44, 46 (FIG. 3). A similar assembly 82 of control valves 74 are provided with corresponding outputs 76, 78 connected to respective input ports of piston-cylinder group 16. It must be noted from FIG. 1, that each of the four-way control valves of the present invention are identical, and are extremely compact so that an assembly of four such control valve can readily be provided.

Reference may be had to FIG. 4 and 5 wherein the basic operating components of the unique four-way control valve of this aspect of the invention are illustrated in schematic form. Inlet port 1 (IP1) connects an air source from port 84 through passageway 86 and terminates in a ridge portion 88 projecting from a top wall 90 of control chamber 92. Outlet passageway 94 communicates with chamber 92 at rear chamber wall 90 and ends in outlet port 1 (OP1) for connection to input port 44 of a respective piston-cylinder in group 12 or 16. A passageway 96 intermediate outlet port 1 and control chamber 92 communicates with passageway 94 and ends in an exhaust control port 1 (ECP1). A bidirectional solenoid plunger 98 having resilient stopper valves 100 and 102 on opposite ends thereof is provided for selectively sealing or unsealing the exhaust control ports. Well-known electrically actuated coil means, shown schematically at 103, selectively operates the solenoid plunger 98 for movement in the respective directions to selectively seal the exhaust control ports.

A diaphragm 104 forms a common wall between control chamber 92 and control chamber 106. Passageway 108 communicates the air source input at port 84 with inlet port 2 (IP2) having an opening within chamber 106 at the top of ridge 110 projecting above bottom wall 112 of the chamber. Passageway 114 interconnects chamber 106 with outlet port 2 (OP2) for selectively directing the fluid flow to piston-cylinder inlet port 46. A branch line 116 intermediate chamber 106 and outlet port 2 extends from passageway 114 and ends in exhaust control port 2 (ECP2). Exhaust control port 2 can be selectively sealed by means of the valve 102 as previously described.

In operation, the diaphragm 104 seals either inlet port 1 or inlet port 2 in response to the position of the solenoid plunger 98. In the valve position shown in FIG. 4, exhaust control port 1 is closed thereby enabling air flow from input 84 to flow through passageway 86 and inlet port 1 into chamber 92, through passageway 94, and outlet port 1 so as to move the piston 120 away from input port 44 to the position shown in FIG. 4. Note that there is no static air loss in the control valve, since although passageway 116 is open, inlet port 2 is sealed by diaphragm 104. Since the area of diaphragm 104 is substantially greater than the ridge opening in chamber 106 at inlet port 2, the differential force is greater in control chamber 92 and the diaphragm 104 is urged against ridge 110 thereby shutting off inlet port 2.

When the solenoid plunger 98 is reversed as illustrated in FIG. 5 so as to seal exhaust control port 2, the minute dynamic leak through exhaust control port 1 lowers the pressure in control chamber 92 below that in control chamber 105. Diaphragm 104 therefore reverses its position and rapidly shuts off inlet port 1 in chamber 92. Thus, in the position of the control valve illustrated in FIG. 5, outlet port 2 is connected via passageway 114, control chamber 106, and inlet port 2 to the air supply so as to urge piston 120 away from the piston-cylinder input port 46. It must be noted that in this case, the differential force on diaphragm 104 is greater in control chamber 106 than in chamber 92, and there is similarly no static air leak through outlet port 1 or exhaust control port 1 since control chamber 92 is sealed by diaphragm 104 from the air source.

Referring now to FIGS. 6 and 7, there is illustrated in detail a four-way control valve 74 constructed in accordance with the principles of this aspect of the invention. In particular, each valve assembly 74 is formed of two identical molded-plastic half-sections 122, 124, each having a ridge 88 extending from a cavity 92 in one face 126 of the respective valve half-section. Passageway 86 is then formed by drilling through ridge 88 a selected distance within the valve half-section perpendicular to the face 126, and thereafter drilling at an intersecting point through surface 128 of the half-section until communication is made with the first passageway as illustrated in FIG. 7. Similar drilling procedures are used to form passageway 94 by drilling through surface 130 (see FIG. 6) and through cavity wall 90 until an output port 1 is formed which connects through passageway 94 with the cavity 92. A hollow metal insert 132 or other suitable means can be provided to form the output port 1. Exhaust control port 1 and connecting passageway 96 is formed by drilling through surface 134 to connect with passageway 94 and inserting a hollow metal member 136.

The valve half-section 124 is constructed in a manner similar to that as described above in connection with half-section 122. Thereafter, a very thin cavity can be made in the face 126 of half-section 122 or the face 138 of half section 124 so as to receive a thin rubber diaphragm 104 extending across either cavity 92 or 106 and cemented to corresponding faces 126 or 138. The half-sections 122 and 124 are thereafter assembled with faces 126 and 138 in contact to form interface 140. The half-sections are held together by suitable mounting means such as bolt and nut means 142.

As is shown in FIG. 6, in the assembled configuration, the diaphragm 140 forms a common wall between control chamber or cavity 92 and control chamber or cavity 106. The electrically actuated coil means 103 is suitably mounted to the control valve assembly.

Thus, in accordance with this aspect of the invention, there has been provided a very readily constructed, efficient, economical, and fast-operating control valve which is especially adaptable to the rectilinear-type x-y slide selector mechanism previously described, and which is also utilized in a novel polar coordinate selection system for retrieving audio information as will be more particularly described hereinafter. As an example of the present invention, a model constructed in accordance therewith operated with 10-12 lbs. per sq. inch pressure with a valve switching time of less than one one-hundredth of a second. The dynamic air loss during switching was less than one-eightieth cubic inch.

Instead of the rectilinear-type orthogonal coordinate selection system shown in FIGS. 1 and 2, similar devices can be provided for selecting any one of a plurality of items in a polar coordinate random access system. A polar coordinate random access system is especially useful for selecting desired audio information stored on standard magnetic discs rotating with respect to a magnetic transducer. In such a system, the angular and radial position of the transducer is varied to select information. The angular position can be obtained by mounting the transducer on a suitable bracket means connected to the central shaft of a magnetic disc drive mechanism. If the central shaft is provided with a pinion gear, a digitally positionable rack gear driving the pinion can be provided for rotating the shaft through 360° and thereby positioning the transducer in any desired angular increment. The radial position of the transducer along a particular radius extending from the shaft and radially along the disc can be provided by a second digitally positionable piston-cylinder combination.

Figure 8:
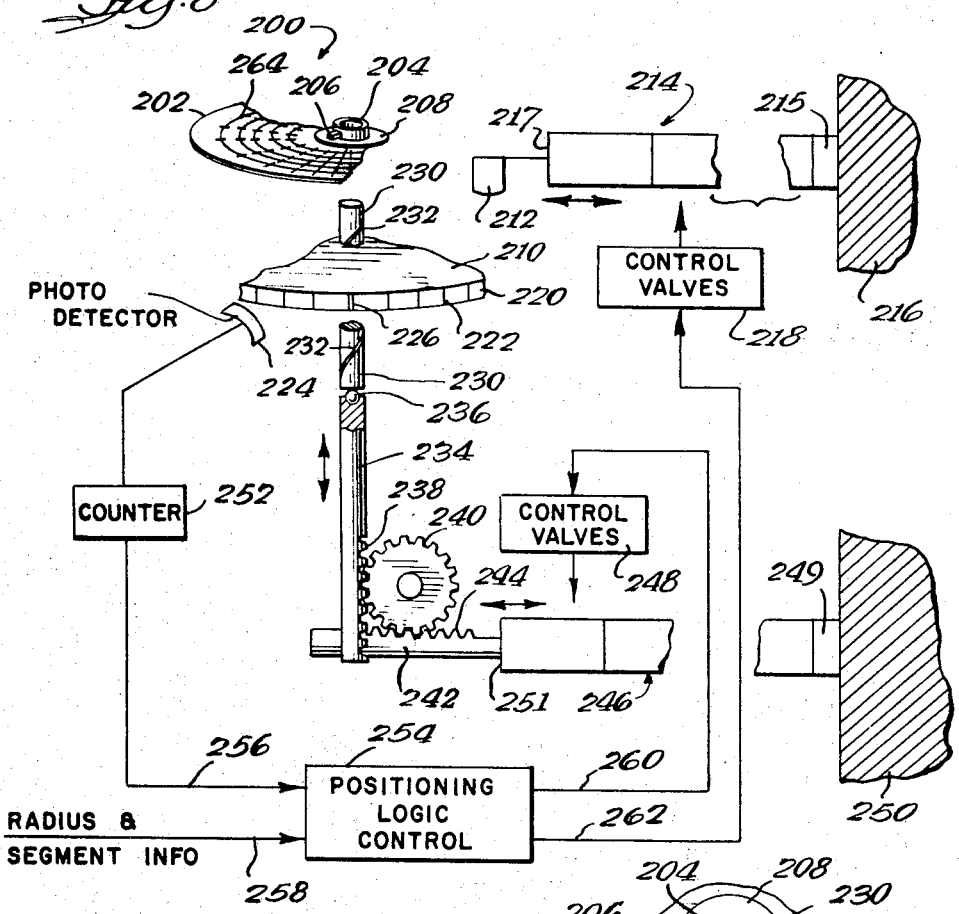
FIG. 8 is a diagrammatic view of a random access audio selector in another aspect of this invention illustrating a novel polar coordinate selection device.
Figures 9, 10:
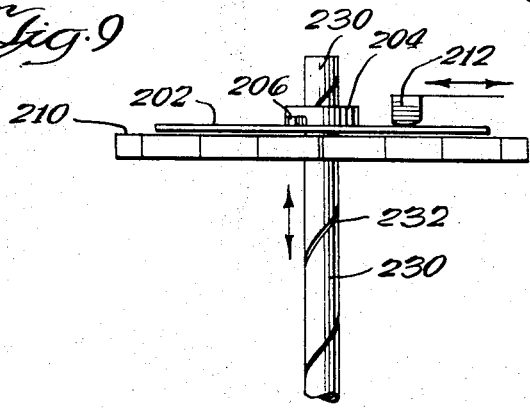
FIG. 9 is a partial elevational view illustrating incremental rotation of the recording disc and radial positioning of the reading and/or playback head during the selection procedure.
FIG. 10 is a partial plan view illustrating the construction details of the hub key slidably engaged in the spiral-slotted shaft for incrementally rotating the recording disc with respect to the constant speed turntable.

A preferred alternative polar coordinate system 200 is illustrated in FIGS. 8, 9 and 10, wherein there is shown a random access system in which information is recorded on and played back from a flat magnetic disc. The recording medium is a standard magnetic recording disc 202 having an oxide coating on at least the top surface thereof for recording information. The disc is mounted on a hub 204 for rotation therewith by suitable means such as a key 206 in flange 208 overlying the disc 202. The disc 202 is normally positioned on and rotates with a high moment of inertia turntable 210 for access by a levitating magnetic read (playback) and/or write head 212 mounted immediately above the disc 202. As will be described in more detail hereinafter, the disc 202 is incrementally rotated with respect to the turntable 210 during the angular selection procedure. It is to be understood that for convenience in illustration, only a partial segment of the disc 202 and turntable 210 are illustrated in FIG. 8, and similarly, the disc is shown as separated from the turntable, whereas it is normally located directly thereon.

Magnetic head 212 is mounted for incremental rectilinear movement radially on disc 202 towards hub 204 by means of a first set of pneumatically driven elements 214 constructed similar to the pneumatically driven elements 12 and 16 previously described. As shown in FIG. 8, the smallest piston-cylinder has one end 215 rigidly maintained in position by fixed means 216 and the opposite end 217 of the largest piston-cylinder element attached to magnetic head 212. A corresponding set of 4-way control valves 218 each constructed similar to the previously described control valves 74 of FIGS. 4-7 is provided for controlling the incremental rectilinear displacement of the magnetic head 212 radially along disc 202.

Around the rim 220 of turntable 210 there is placed a series of markers 222 for detection by photodector means 224 so as to detect the angular position of disc 202 during rotation with respect to a reference position. A reference marker 226 is provided on rim 220 to indicate angular displacement of the disc from the reference position. Instead of the optically sensed markers 222, other marking means, such as a magnetically coded strip around rim 220 with a corresponding sensing head can be utilized. It is to be understood that the turntable 210 is rotated by any convenient rotating means (not shown), preferably at a constant rotational speed.

Positioning of the disc 202 in angular direction with respect to the high-mass turntable 210 during the information selection procedure is provided by a vertically movable shaft 230 passing through a central aperture in the turntable and having a spiral slot 232 extending along the length thereof to accommodate the key 206 in hub 204. Key 206 extends radially through hub 204 and into the spiral slot 232 as shown more clearly in FIG. 10. The hub 204 and attached recording disc 202 are free to rotate with respect to turntable 210 in response to vertical movement of the shaft 230. The shaft 230 is moved in incremental steps by means of a vertical arm 234 having a ball bearing 236 mounted at one end thereof and a toothed gear segment 238 at the other end thereof for engagement with a rotating gear member 240. The rotating gear member 240 is driven by a horizontal arm 242 having a toothed gear section 244 engaging the gear member 240 and being moved incrementally in horizontal position by means of a second set of pneumatically driven elements 246 under control of suitable control valves 248 in an arrangement similar to the pneumatic elements 214 and control valves 218 provided for radially positioning the magnetic head 212. One end 249 of pneumatic driven elements 246 is fixed by suitable rigid means 250 while the other end 251 is connected to the horizontal arm 242. Thus, operation of one of the pneumatic driven elements 246 moves shaft 230 vertically to enable the key 206 to slide along spiral slot 232 and thereby rotate attached disc 202 through a corresponding incremental angular displacement from its initial position. During non-operation of the pneumatic elements 246 the disc 202 rotates simultaneously and at the same rotational velocity as the turntable 210. It is to be understood that during rotation of the disc from one angular position to another, the magnetic head 212 is inactivated so that no information is transferred to or from the disc 20 during the selection interval. The selection interval is, of course, much less than the reading interval during which information is being played back from the disc 202.

Photodetector 224 senses the markers 222 and the corresponding reference marker 226 so as to indicate through signals provided by counter 252 the angular position of turntable 210, which information is coupled into a positioning logic control apparatus 254 on input line 256. Positional information corresponding to the desired information recorded on disc 202 and containing a corresponding radius and segment address is also coupled on input line 258 to the positioning logic control apparatus 254. Positioning logic control apparatus 254 integrates the signals from the input lines to provide suitable control signals on output lines 260 and 262 to the respective control valves 218, 248 for radially positioning magnetic head 212 and angularly positioning the magnetic disc 202.

In the preferred embodiment of this aspect of the invention, the polar coordinate random access system 200 illustrated in FIGS. 8-10 is utilized as a source of audio information in a display teaching system of the type shown in the previously mentioned U.S. Pat. No. 3,405,457, "Versatile Display Teaching System," Donald L. Bitzer, issued Oct. 15, 1968. As indicated, this patent discloses a flexible computer controlled display system for displaying various instructional material to a group of student stations. The present random access system 200 is especially desirable as a source of audio information which has previously been recorded on any one of 64 circular tracks each located at a discrete radial distance from the hub 204, and indicated for illustration by the reference numeral 264 in FIG. 8. Each track 264 contains 32 recording segments, with the angular distance between each segment corresponding to the distance between markers 222 on the turntable rim 220. The turntable 210 is rotated at a speed of approximately 10 seconds per revolution.

In an actual model constructed in accordance with this aspect of the invention, the piston-cylinder set 214 comprised a six-unit pneumatic piston-cylinder train with the size and movement of the smallest radial piston corresponding to the radial distance between recording tracks on disc 202, or as commonly termed, the "intertrack distance." Thus, the reading head 212 could be incrementally positioned to any one of the 64 tracks by selectively operating combinations of one or more of the six piston-cylinders. The pneumatic set 246 comprised a five unit pneumatic piston-cylinder train capable of angularly incrementally rotating the disc 202 through any one of 32 steps. In this case, the size and movement of the smallest piston connected to horizontal arm 242 corresponded to the distance between segments on each track. Thus, with the piston-cylinder set 214 in the fully retracted position, magnetic head 212 is in communication with the outermost track on disc 202, and when fully extended, the magnetic head 212 is in communication with the innermost track, with each of the 64 tracks being capable of selection through control signals from positioning logic control apparatus 254 coupled through the control valves 218.

Since the piston-cylinder set 214 is fixed at one end, and the magnetic head 212 is selectively moved in relation thereto, the radius information on line 258 corresponds to the actual address of the desired information on disc 202. However, since the turntable 210 is rotating at a constant speed, its present position will be sensed by photodetector 224 and this information coupled on input line 256 to the positioning logic control unit 254, so that the present position information can be combined with the address of the desired as applied on input line 258. Positioning logic control unit 254 is therefore a standard integrating circuit which in effect subtracts the address of the desired segment position on input line 258 from the detected present position information on input line 256 to provide suitable signals on output line 260 coupled to control valves 248.

In the random access apparatus constructed in accordance with this aspect of the invention, shaft 230 is moved vertically a maximum of approximately 3 inches in rotating the disc 202 through a maximum rotation angle of 360° —in other words, through each of the 32 segments on a single track. The spiral slot 232 on shaft 230 has a low pitch so as to facilitate the case of angularly rotating disc 202 in response to vertical movement of the shaft 230.

FIG. 9 illustrates a schematic view for illustrative purposes of a selecting sequence wherein the shaft 230 is displaced vertically an incremental amount which has incrementally rotated the disc 202 with respect to turntable 210 until the desired segment position is located beneath the head 212. During rotation of the disc 202, the head 212 has also been moved radially on the disc to one of the desired 64 tracks. A weighted cap 270 is placed over the hub 204. This urges the key 206 to slide along spiral slot 232, thereby minimizing vertical movement of the disc and enabling the disc to rotate with respect to the turntable during vertical movement of shaft 230 in the segment selection procedure.

Various alternative arrangements of the inventions herein can be provided. For instance, instead of the single spiral slot 232 and key 206, a shaft with two or four parallel spiral grooves or slots with associated keys could be provided to distribute the forces more evenly. In another alternative embodiment, a return spring having one end mounted in the bottom end of shaft 230 and the other end fixedly mounted in position, and cooperating with a wire attached at one end to the shaft bottom and at the other end to the piston-cylinder elements 246 can be utilized in place of the arms 242 with toothed gear segments 238, 244 and rotating gear member 240 shown in FIG. 8. In operation, the wire is moved longitudinally by the associated piston-cylinder elements to vertically move shaft 230, and the return spring is utilized to reposition the shaft.

Therefore, the foregoing detailed description has been given for clearness of understanding only, and no unnecessary limitations should be understood therefrom, as modifications will be obvious to those skilled in the art.

What is claimed is:
1. A four-way control valve comprising:
   a valve housing having a pair of inlet ports for connection to a pressure source and a pair of out-let ports for connection to a load;
   a first control chamber communicating one of said inlet ports with one of said outlet ports;
   a second control immediately adjacent said first chamber and communicating the other of said inlet ports with the other of said outlet ports;
   a diaphragm intermediate said first and second chambers and forming a common wall therebetween; and
   a diaphragm control means for moving said diaphragm to selectively seal one of said inlet ports in said respective first and second chambers to control the fluid flow between said inlet and outlet ports.

2. A four-way control valve according to claim 1, wherein said diaphragm control means comprises selectively actuable means connected to said pair of outlet ports for effecting selective movement of said diaphragm in sealing engagement with respective inlet ports.

3. A four-way control valve according to claim 2, wherein said selectively actuable means comprises a pair of exhaust control ports each coupled to a respective outlet port, and electrically actuated means including a double-ended solenoid sealing member operable between said exhaust control ports for sealing one exhaust control port while simultaneously unsealing the other exhaust control port, the unsealing of said exhaust control port slightly lowering the pressure in the associated control chamber and enabling said diaphragm to thereby seal the associated inlet port to transfer the fluid flow between the other inlet-outlet ports.

4. A four-way control valve according to claim 1, wherein within each of said control chambers, said inlet ports extend closer to said diaphragm than said outlet ports.

5. A 4-way control valve according to claim 4, wherein said diaphragm is flexed convexly towards one of said inlet ports in said first control chamber to seal said inlet port and thereby interrupt communication between respective inlet and outlet ports in said first control chamber.

6. A 4-way control valve according to claim 1, wherein the area of said diaphragm is larger than the opening of each of said inlet ports in said control chambers.

7. A four-way control valve according to claim 6, wherein the total pressure exerted on said diaphragm from said pressure source through the unsealed inlet port in said first control chamber is exerted upon substantially the entire area of said diaphragm to maintain said diaphragm in sealing position on the other inlet port in said second control chamber.

8. A four-way control valve according to claim 7, wherein said diaphragm control means includes means coupled to the outlet port communicating with said unsealed inlet port for rapidly exhausting said outlet port to lower the pressure on said diaphragm in said first control chamber below the pressure on said diaphragm in said second control chamber, thereby flexing said diaphragm into sealing position against the inlet port in said first control chamber.

9. A four-way valve structure comprising:
   a valve housing having a chamber therein bounded by inner walls;
   a pair of opposing outlet apertures on opposite inner walls in said chamber leading to respective outlet passageways within said valve housing forming first and second outlet ports;
   opposing projections adjacent said outlet apertures, each extending from said opposite inner walls towards the inner portion of said chamber;
   said projections each having inlet apertures leading to respective inlet passageways within said valve housing forming first and second inlet ports;
   a resilient diaphragm member mounted in said chamber intermediate said opposite inner walls and between said opposing projections;
   said diaphragm dividing said chamber into equal half sections each having a respective inlet and outlet aperture; and exhaust control means connected to respective outlet ports for flexing said diaphragm into engagement with one of said projections in one of said chamber half sections and sealing the corresponding inlet aperture from communication with the associated outlet aperture, thereby enabling communication between the other inlet-outlet apertures in the other chamber half section.

* * * * *

PO-1050
(5/69)

UNITED STATES PATENT OFFICE
CERTIFICATE OF CORRECTION

Patent No. 3,770,012          Dated November 6, 1973

Inventor(s) Donald L. Bitzer, et al.

It is certified that error appears in the above-identified patent and that said Letters Patent are hereby corrected as shown below:

Column 1, line 61, "one-two-hundredth" should be --one one-hundredth--.

Column 2, line 66, after "in" insert --a--.

Column 3, line 23, delete "two".

Column 3, line 64, "x-11" should be --x=11--.

Column 3, line 64, "y-4" should be --y=4--.

Column 4, line 2, "mage" should be --image--.

Column 4, line 9, "14n" should be --14a--.

Column 4, line 21, "case" should be --ease--.

Column 6, line 50, "on" should be --to--.

Column 7, line 61, "20" should be --202--.

Column 8, line 66, after "desired" insert --position--.

Column 9, line 11, "case" should be --ease--.

Column 9, line 37, after "arms" insert --234--.

Column 10, line 11, "unscaling" should be --unsealing--.

Signed and sealed this 2nd day of July 1974.

(SEAL)
Attest:

EDWARD M. FLETCHER, JR.
Attesting Officer

C. MARSHALL DANN
Commissioner of Patents